(No Model.) 3 Sheets—Sheet 3.
A. H., H. & G. VAN DER VYGH.
CONSTRUCTION OF FIREPROOF BUILDINGS.
No. 597,039. Patented Jan. 11, 1898.
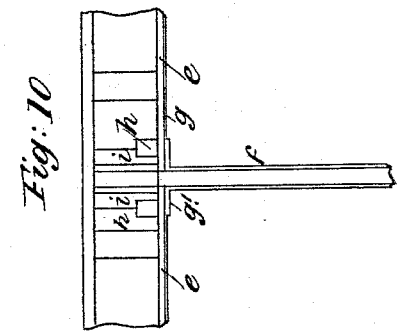
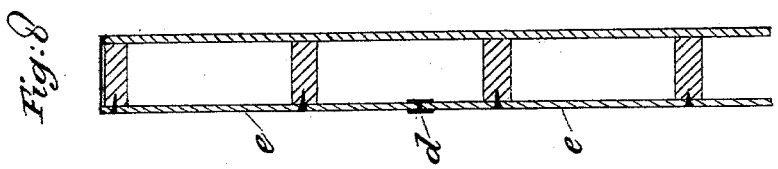
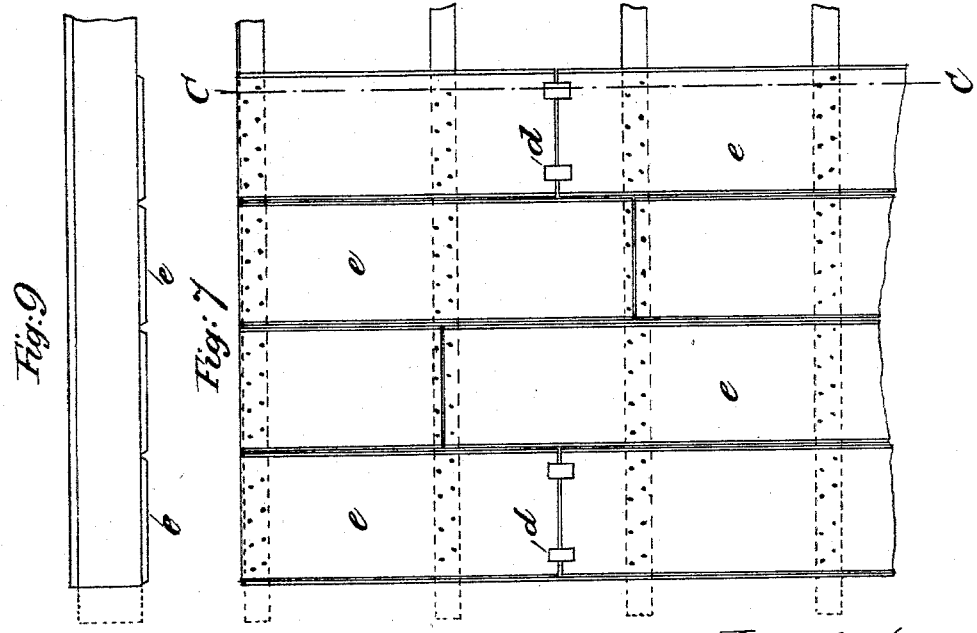

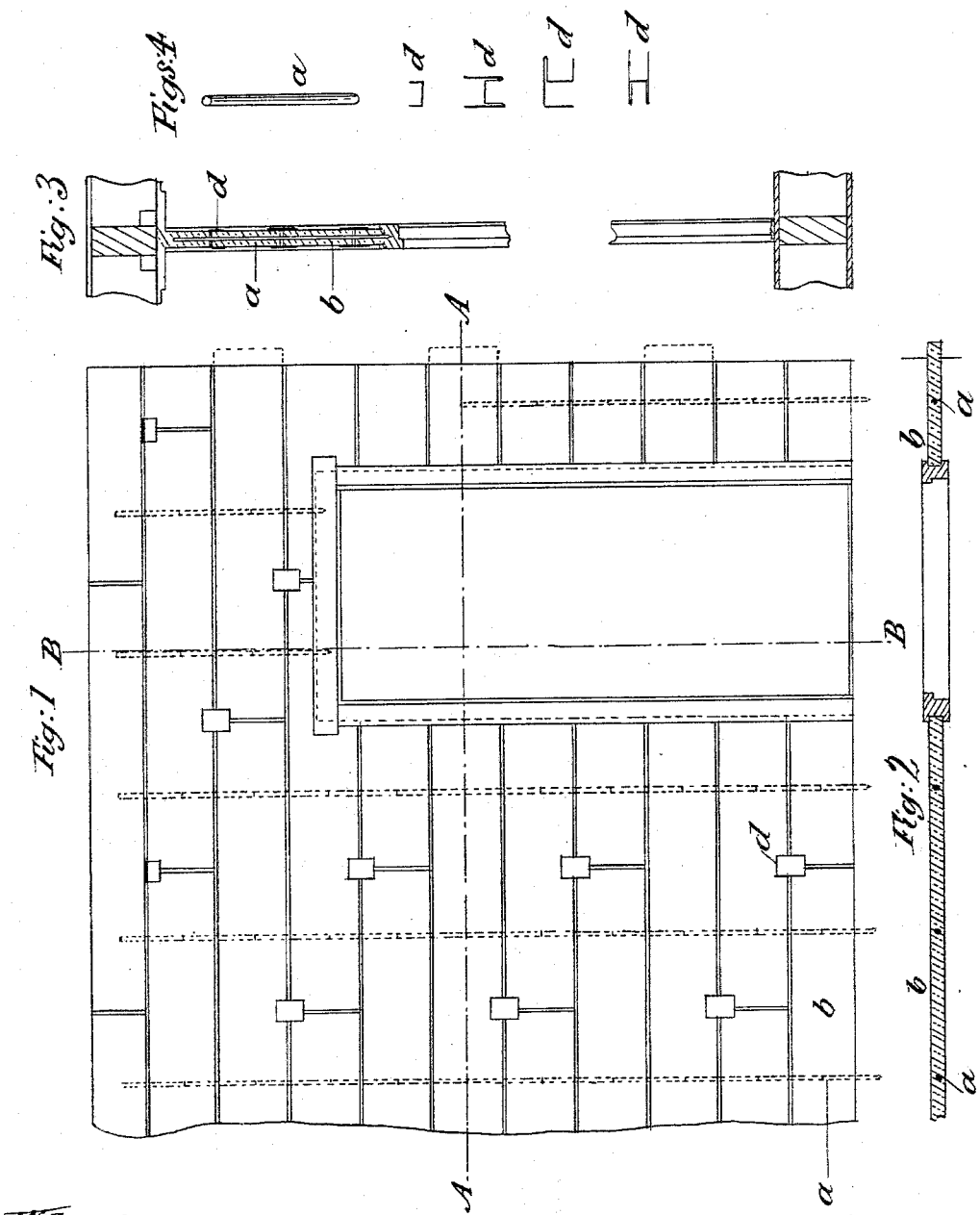

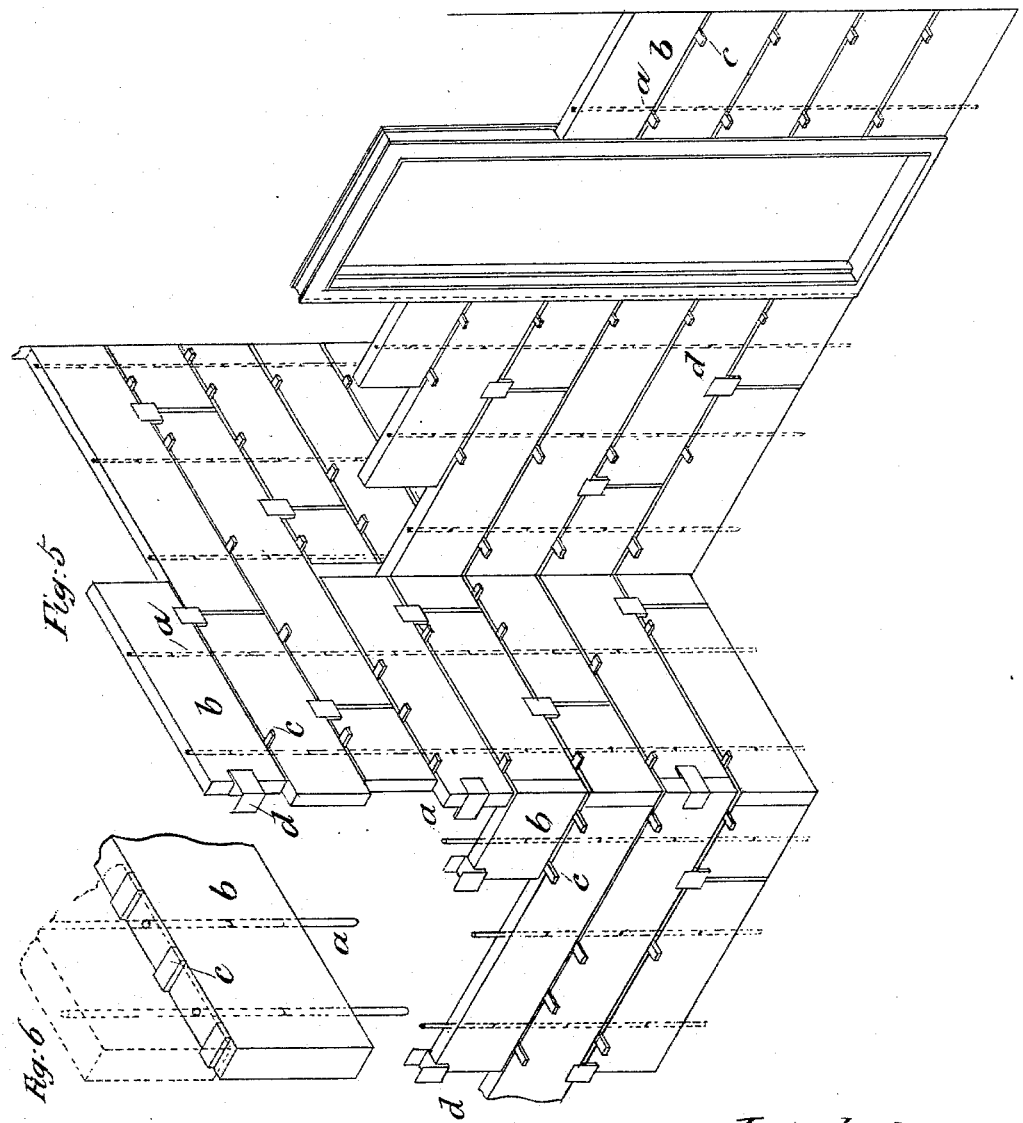

UNITED STATES PATENT OFFICE.

ALBERT HENDRIK VAN DER VYGH, HENDRIK VAN DER VYGH, AND GERHARD VAN DER VYGH, OF AMSTERDAM, NETHERLANDS.

CONSTRUCTION OF FIREPROOF BUILDINGS.

SPECIFICATION forming part of Letters Patent No. 597,039, dated January 11, 1898.

Application filed February 1, 1897. Serial No. 621,549. (No model.)

*To all whom it may concern:*

Be it known that we, ALBERT HENDRIK VAN DER VYGH, residing at No. 4 Bosboom Toussaint Street, and HENDRIK VAN DER VYGH and GERHARD VAN DER VYGH, residing at No. 2 Bosboom Toussaint Street, Amsterdam, Netherlands, subjects of the Queen of the Netherlands, have invented new and useful Improvements in the Construction of Fireproof Buildings, of which the following is a specification.

Our invention relates more particularly to buildings that are constructed either wholly or partly of our improved fireproof composition, which is described and claimed in the specification accompanying our application of even date herewith for the grant of Letters Patent therefor, and has for its object to cheaply and quickly construct the walls and ceilings of such buildings at any season and even during heavy frost, thus greatly facilitating building operations, economizing labor, and reducing expense. We attain this object by the means illustrated in the accompanying drawings, wherein—

Figure 1 is an elevation, and Figs. 2 and 3 are sections, taken on the lines A A B B, Fig. 1, of a wall constructed according to our invention. Fig. 4 shows detail views of one of the wall-pins and of various sections of the iron ties presently referred to. Fig. 5 is an elevation of a portion of a wall, showing how such pins and ties are employed. Fig. 6 is a detail view showing how the wall-plates are superposed. Fig. 7 is a plan, Fig. 8 a section taken on the line C C, Fig. 7, and Fig. 9 an end view, of a portion of a ceiling constructed according to our invention; and Fig. 10 is a detail view showing how such ceiling-plates are fixed to a vertical wall.

Similar letters of reference indicate corresponding parts throughout the several views.

In order to clearly illustrate our invention, we will first describe the same as applied to the construction of walls, and, secondly, as applied to constructing ceilings.

To construct a wall, a series of iron pins $a$ of any convenient size are driven into the ground or other foundation half-way. Perforated wall-plates $b$, made of our improved fireproof composition, are then placed on the projecting ends of such pins, which reach midway up the perforations in the wall-plates, wherein the pins fit and form internal uprights to keep the plates in position. Two, three, or more small laths $c$ are then placed across the top of each wall-plate, as shown in Figs. 5 and 6, and a second series of pins inserted in the perforations therein. The lower ends of such second series of pins rest on the tops of the bottom pins, as shown in Figs. 1 and 5, while their upper ends project half-way above the wall-plates ready to receive a second course of such plates, which is then superposed thereon, the interstices created by the cross-laths being placed between the two courses being filled in with a cement composed of a mixture of lime, coarse sand, plaster, and water combined in the following proportions, viz: lime, fifteen parts; coarse sand, such as common river sand, fifteen parts; plaster, forty parts, and water thirty parts. The cement joints thus formed serve to unite the wall-plates and to strengthen the wall.

The perforations in the wall-plates correspond both in size and position, so that the holes in the lower course of plates come immediately opposite the holes in the upper course when such upper course is superposed. After the second course of plates has been so superposed laths are placed across the top of each wall-plate and another series of pins inserted in the perforations therein in the manner already described, after which another course of wall-plates is superposed, and these several operations are repeated until the wall is raised to the required height.

When the wall is finished, should any space be left between the top of the wall and the ceiling such space may be readily filled in by sawing a sufficient number of our improved fireproof wall-plates to the required size and fixing them by means of nails or screws to the window-frames and ceiling or any other convenient supports.

In cases where it is impracticable to use iron pins in the manner already described, or where only an insufficient number of such pins can be employed, iron ties $d$ may be substituted therefor or used in conjunction therewith, as shown at Fig. 5, and when used such ties serve to bind two or three wall-plates together and so prevent the wall bulging.

When building external walls with our improved fireproof wall-plates, such plates are coated with Portland cement, which greatly enhances their strength and durability and renders them far cheaper than any other building material.

Thin free standing walls constructed in this manner and with our improved fireproof wall-plates may be very cheaply and quickly built and require slighter foundations than are requisite for any other system of construction. They possess great bearing power and are impervious to heat, cold, and sound. They do not harbor insects or vermin and can be stuccoed without being previously wetted, while in a few days they are fit either for painting or papering.

As regards the construction of ceilings with our improved fireproof composition the ceiling-plates $e$ are preferably made of a thickness of about one and one-half centimeters, which is sufficient even where center flowers or other heavy ornamentation are used. Such plates are preferable to any other material, being lighter as well as sound and fireproof, while they are not liable to crack when coated with plaster. They are fastened to the ceiling-joists by nails or screws, as shown in Figs. 7 and 8, spaces of about half a centimeter being left between them, which are subsequently filled in with a mixture of lime, coarse sand, plaster, and water combined in the proportions hereinbefore specified. Such plates are not sawed off in lengths from joist to joist; but where a joint comes between two joists the ends of the two plates are fastened together by iron tie-plates, as shown in Figs. 7 and 8, and when the plates are fixed on a vertical wall they are secured in the manner shown in Fig. 10, wherein $e$ are the ceiling-plates; $f$, the vertical wall; $g$, common level plastering or stucco; $g'$, plaster band; $h$, wooden supports; $i$, joists whereto ceiling-plates are nailed.

Ceilings constructed in this manner and with our improved fireproof ceiling-plates are very easily and quickly fixed.

What we claim as our invention, and desire to secure by Letters Patent of the United States, is—

In a fireproof wall the following combination viz: perforated fireproof wall-plates $b$ superposed on laths $c$, and united by cement joints, and held in position by pins $a$, and ties $d$, used either in conjunction with each other or separately, all substantially as set forth.

ALBERT HENDRIK VAN DER VYGH.
    HENDRIK VAN DER VYGH.
    GERHARD VAN DER VYGH.

Witnesses:
    FREDRICK CARL KRAÄG,
    HEINRICH PIETER GEVERS.